L. L. DENNIS.
EGG POACHER.
APPLICATION FILED MAR. 28, 1913.
1,097,398.
Patented May 19, 1914.
2 SHEETS—SHEET 1.
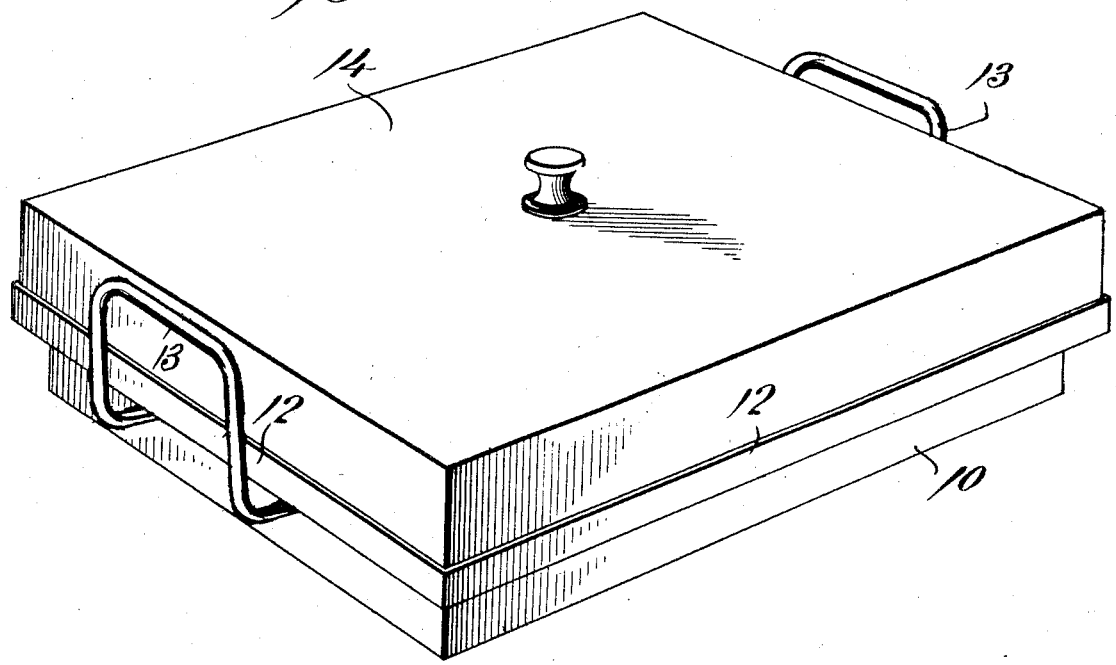
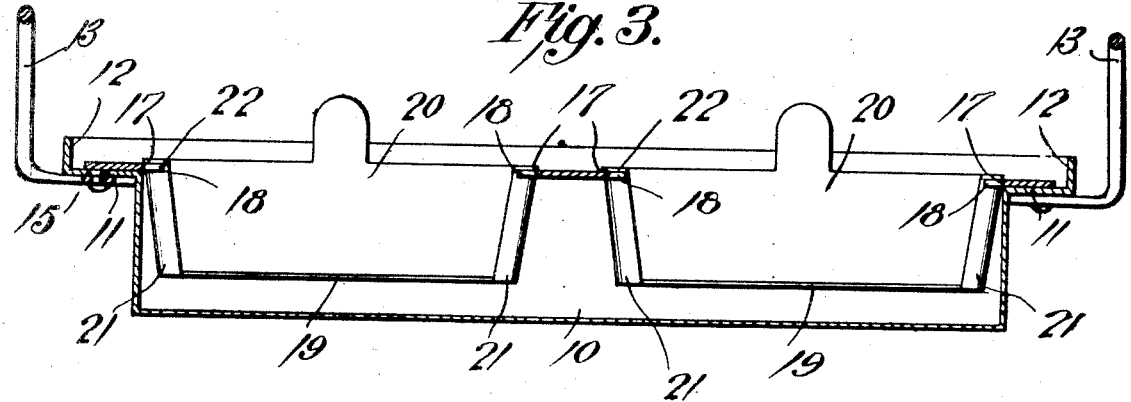

L. L. DENNIS.
EGG POACHER.
APPLICATION FILED MAR. 28, 1913.
1,097,398.
Patented May 19, 1914.
2 SHEETS—SHEET 2.
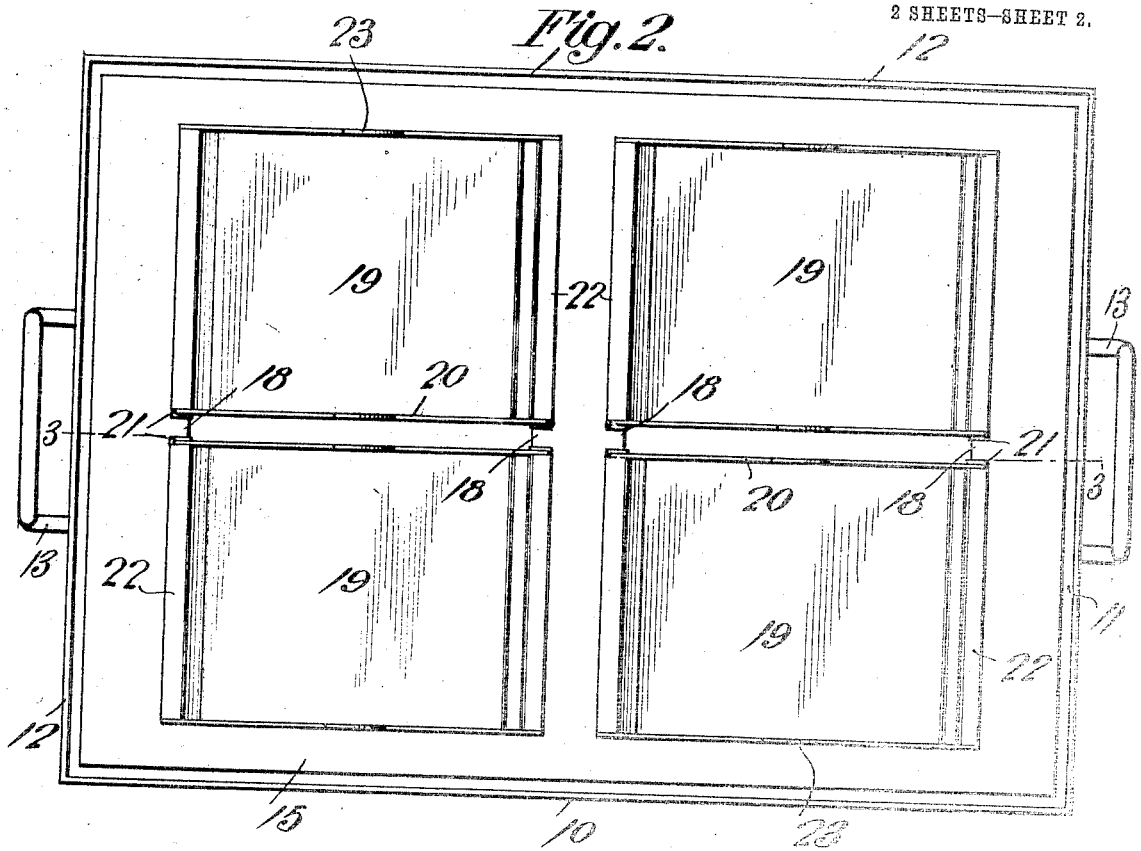
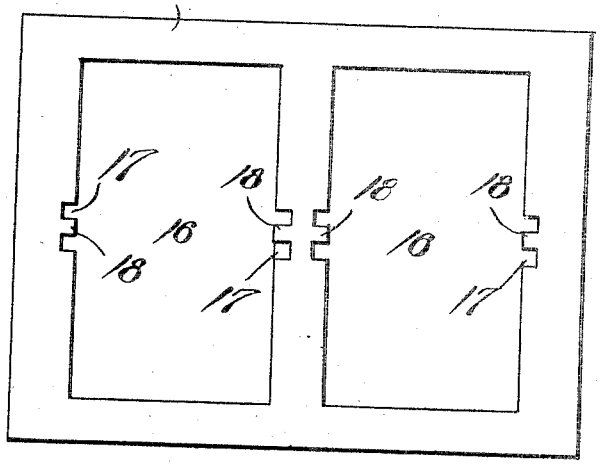
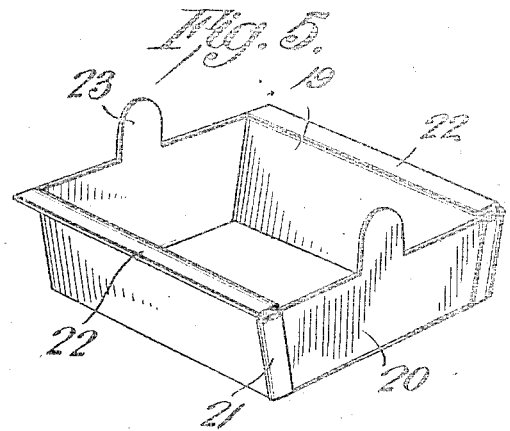
Witnesses
Carroll Bailey
E. L. Mueller
Inventor
Lyman L. Dennis,
By Victor J. Evans
Attorney

UNITED STATES PATENT OFFICE.

LYMAN L. DENNIS, OF MEMPHIS, MISSOURI.

EGG-POACHER.

1,097,398.

Specification of Letters Patent. Patented May 19, 1914.

Application filed March 28, 1913. Serial No. 757,428.

*To all whom it may concern:*

Be it known that I, LYMAN L. DENNIS, a citizen of the United States, residing at Memphis, in the county of Scotland and State of Missouri, have invented new and useful Improvements in Egg-Poachers, of which the following is a specification.

The general object of this invention is the provision of an egg poacher comprising a main receptacle adapted to contain water, said receptacle being constructed in a novel manner and adapted to have detachably mounted therein one or more egg holders which are also constructed in a novel manner so that an egg can be readily removed therefrom, thereby preventing the same from being broken.

In carrying out the objects of the invention generally stated above, it will be understood, of course, that the essential features thereof are susceptible to changes in details and structural arrangements, one preferred and practical embodiment being shown in the accompanying drawings, wherein:

Figure 1 is a perspective view of the poacher constructed in accordance with the invention. Fig. 2 is a top plan view thereof with the cover removed. Fig. 3 is a section on the line 3—3 of Fig. 2. Fig 4 is a plan view of a supporting plate used in connection with the invention. Fig. 5 is a perspective view of one of the egg holders.

Referring more particularly to the accompanying drawings, in which like reference characters designate similar parts, it will be seen that the invention comprises a main receptacle 10 adapted to contain water and having at its top an annular laterally extending flange 11 provided with the sides 12. The receptacle is also provided with the outstanding and upturned handles 13 and a cover 14 which is adapted to rest upon the flange 13. A supporting plate 15 is also adapted to be mounted upon the flange 11 and said plate is provided with a pair of spaced elongated openings 16, the opposite sides of said openings being formed with two adjacent recesses presenting an intermediate projecting lug 18 for a purpose which will be hereinafter described.

A plurality of egg holders 19 are detachably supported in the openings 16, each of said holders being formed from a single sheet of material and having an open end which is adapted to be closed by a gate 20 which is adapted to slide in the alined grooves formed by the bent extensions 21 which are formed at the sides of the holder adjacent the open end thereof. Each of the holders is supported upon the plate 15 by means of the laterally extending flanges 22 which project from the sides of said holder and when in position in the receptacle, the extensions 21 of the holder are adapted to engage the walls of the recesses 17 and also the lugs 18 thus preventing any movement of the holder in the opening 16 into which it is inserted. The holders 19 are each provided with the handles 23 whereby the said holders may be readily lifted from engagement with the plate 15.

When it is desired to poach an egg the same is broken and placed in one of the holders after such holder has been placed in the water in the receptacle. The placing of the egg in the holder subsequent to the immersion of the latter in the holder causes immediate coagulation of the egg and prevents the same sticking to the holder. After the egg has been poached the holder is removed from the receptacle by means of the handle 23 and tilted so as to drain off the water. The gate 20 is then lifted and the egg is readily removed from the holder by further tilting the same thus insuring the safe removal of the egg without breaking the same.

From the foregoing description taken in connection with the accompanying drawings it will be seen that the invention contemplates providing an egg poacher which is simple in construction thus reducing the cost of manufacture of the same to a minimum and which is effective in carrying out the purpose for which it is designed.

What is claimed is:—

A device of the class described comprising a main receptacle having an annular flange at the top thereof, a supporting plate resting upon said flange and having spaced openings therein, said openings being provided with oppositely disposed recesses, lugs extending from said recesses, a plurality of egg holders adapted to be inserted into said openings and engage said lugs and the walls of said recesses, each of said holders comprising a single sheet of material and having an open end, extensions formed at the open end of said holders and adapted to engage said lugs and the walls of said recesses, and a gate adapted for slidable engagement with said extensions for closing said open end.

In testimony whereof I affix my signature in presence of two witnesses.

LYMAN L. DENNIS.

Witneses:
D. H. KINCHELOE,
JOHN L. HOLLEY.